W. SCOTT.
Stopping and Reversing Mechanism for Machinery.
No. 221,193. Patented Nov. 4, 1879.
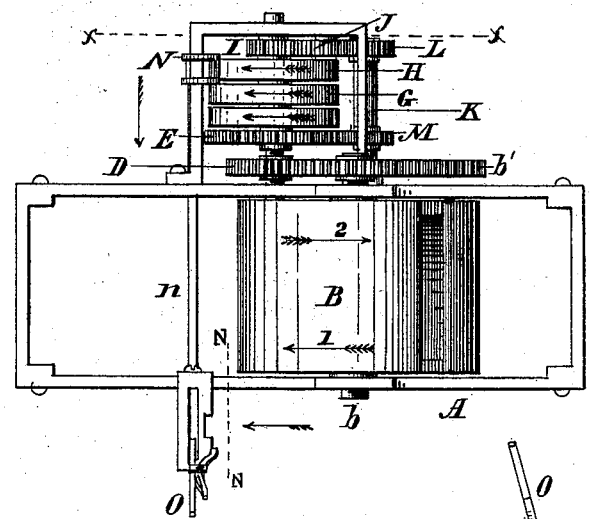
Fig 1
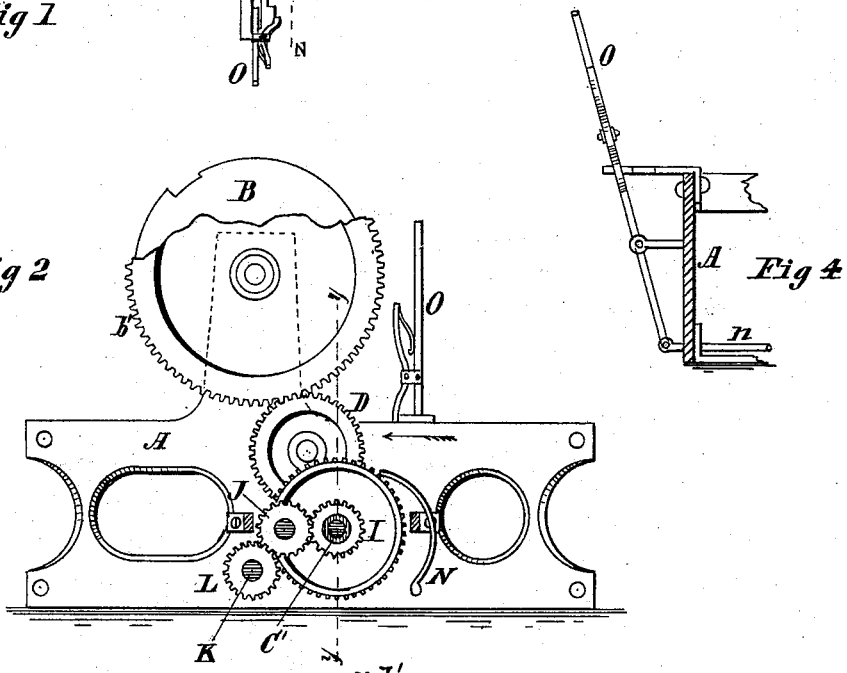
Fig 2
Fig 4
Fig 3
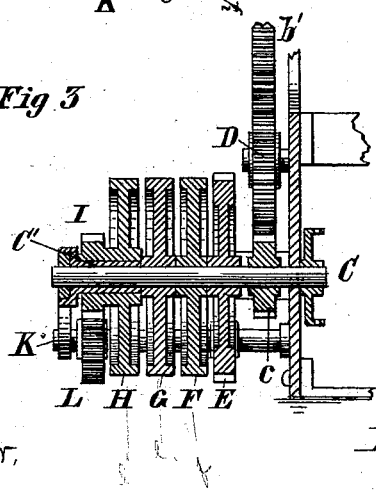
Witnesses
W. C. Corlies
Jno. C. MacGregor
Inventor
Walter Scott
By Coburn & Thacher
Attorneys

UNITED STATES PATENT OFFICE.

WALTER SCOTT, OF CHICAGO, ILLINOIS.

IMPROVEMENT IN STOPPING AND REVERSING MECHANISMS FOR MACHINERY.

Specification forming part of Letters Patent No. 221,193, dated November 4, 1879; application filed August 2, 1879.

*To all whom it may concern:*

Be it known that I, WALTER SCOTT, of Chicago, in the county of Cook and State of Illinois, have invented a new and useful Improvement in Stopping and Reversing Mechanism for Printing - Presses and other Machines, which is fully described in the following specification, reference being had to the accompanying drawings, in which—

Figure 1 represents a plan view of the stopping and reversing mechanism embodying my improvements; Fig. 2, a section of the same taken on the line $xx$, Fig. 1; Fig. 3, a detail section taken on the line $yy$, Fig. 2; and Fig. 4, a detail section taken on the line $zz$, Fig. 1.

My invention relates to mechanism for stopping machinery and reversing its motion, the object being to provide a simple, cheap, and efficient mechanism for this purpose.

The improvement is especially adapted to printing-presses, and is shown in the drawings thus applied; but it is not confined to machines of this kind, but is applicable to machinery generally wherever such mechanism is required.

The invention consists in special devices and combinations of devices, all of which will be hereinafter more fully explained, and pointed out definitely in the claims.

In the drawings, A represents a supporting-frame, on which is mounted a printing-cylinder, B, carried by a shaft, $b$, on one end of which is the main gear-wheel $b'$. At one side of this supporting-frame, and below the main gear-wheel, is a shaft, C, supported on suitable bearings, on the inner end of which is a fixed pinion, $c$, between which and the main gear-wheel $b'$ is an ordinary transmitting-gear, D, arranged to mesh with each of the above-mentioned gears.

Just outside of the pinion $c$ is a gear-wheel, E, and outside of this gear-wheel is a band-pulley, F, all fixed to the shaft C. Two additional band-pulleys, G and H, are mounted loosely on the same shaft.

The shaft C may have its bearing at its outer end in a sleeve, C', fastened to the frame, and the pulley H and pinion K may then be mounted loosely on this sleeve, thereby saving some friction.

The idle-pulley G has no attachment and is an ordinary idle-pulley.

A shaft, K, mounted in suitable bearings, is arranged at one side of and below the shaft C, and is provided with two fixed pinions, one, L, at its outer end, which engages with the transmitting-pinion J that is arranged to also mesh with the loose pinion I, attached to the pulley H.

The inner pinion, M, on the shaft K, is arranged to mesh with the fixed wheel E on the shaft C, as shown in Fig. 1 of the drawings.

A band-shifter, N, is attached to sliding rod $n$, to one end of which is pivoted a lever, O, which is provided with suitable stopping device, so that the shifting mechanism may be held in the desired adjustment.

It is evident from the above description that the motion of the shaft C is always communicated to the main wheel $b'$ through the medium of the fixed pinion $c$ and the transmitting-gear D.

Now, suppose the direction of the band is such that the band-pulleys revolve in the direction shown by the arrows in Fig. 1 of the drawings. If the band is on the pulley F the shaft C will be driven directly thereby, as the pulley is fast thereon, and the main wheel $b'$ and cylinder B will be revolved in the same direction as the pulley, as indicated by the arrow 1 in the same figure.

If the band is shifted to the loose pulley G, it is evident that no motion will be communicated to the shaft C, and hence the machine will be stopped; but if shifted to the loose pulley H, motion will be communicated through the pinions I, J, and L to the shaft K, which will be revolved in the same direction as the pulley H. This shaft K will in turn communicate motion to the shaft C through the fast pinion M, meshing directly with the gear E; but this connection will, of course, rotate the shaft C in an opposite direction to the shaft K and band-pulley H, thereby reversing the motion of the main wheel $b'$ and cylinder B, and causing them to revolve in the direction indicated by the arrow 2 in Fig. 1 of the drawings.

It will be seen that by shifting the band from one to the other of the three band-pulleys on the shaft C, the main gear-wheel may be driven in one direction, reversed, or caused to move in the opposite direction, or stopped entirely, as may be desired.

When the band is on the pulley F the shaft K will, of course, be rotated; but this does not affect the rotation of the shaft C, as the pulley H is loose thereon, and so will be driven idly during this connection.

This mechanism is very compact, simple, and efficient, and works with promptness and certainty. It is applicable not only to printing-presses but to any machine where a reversing mechanism is required, as well as a stopping device.

It is evident, also, that the pulleys F, G, and H may be exchanged for gears, either friction or toothed, a movable friction-pulley or toothed pinion being arranged to engage with either, according to adjustment. Other devices may also be employed for connecting the loose pulley H back to the shaft C, so as to drive the latter by this pulley.

The loose pulley H may be geared back to some other part of the mechanism instead of the shaft C—for instance, gearing connected with the intermediate gear between the main wheel and the pulley-shaft, or it may be geared to the main gear-wheel itself. These modifications would require only ordinary mechanical skill to devise the changes necessary.

Having thus described my invention, what I claim as new, and desire to secure by Letters Patent, is—

1. The shaft C, in combination with fast pulley F and loose pulley H mounted thereon, pinions I J L, and counter-shaft K, connected back to shaft C, whereby the latter may be driven by either pulley, but in opposite directions, substantially as described.

2. The shaft C, in combination with the gear E and pulley F fast thereon, the loose pulley H, and loose pinion I connected to the latter, transmitting-gear J, and shaft K, provided with the fast pinions L and M, substantially as described.

3. The main drive-wheel $b'$, in combination with the shaft C, to which it is geared, fast and loose pulleys F H, shaft K, and gear-wheels I, J, L, M, and E, substantially as described.

4. The main gear-wheel $b$, in combination with the shaft C, to which it is geared, band-pulleys F G H, counter-shaft K, gear-wheels I J L M E, and a shifting device for shifting the band from either of said pulleys to one of the others, substantially as and for the purpose set forth.

5. The shaft C, in combination with the fast pulley F, sleeve $C'$, and loose pulley H, and pinion I, substantially as described.

WALTER SCOTT.

Witnesses:
L. A. BUNTING,
JNO. C. MACGREGOR.